United States Patent
Suzuki et al.

(10) Patent No.: US 12,264,726 B1
(45) Date of Patent: Apr. 1, 2025

(54) SPEED REDUCER AND MOTOR WITH SPEED REDUCER

(71) Applicant: MITSUBA Corporation, Gunma (JP)

(72) Inventors: Masatoshi Suzuki, Gunma (JP); Tetsuya Watanabe, Gunma (JP)

(73) Assignee: MITSUBA Corporation, Gunma (JP)

( * ) Notice: Subject to any disclaimer, the term of this patent is extended or adjusted under 35 U.S.C. 154(b) by 0 days.

(21) Appl. No.: 18/656,526

(22) Filed: May 6, 2024

(30) Foreign Application Priority Data

Sep. 19, 2023 (JP) .................................. 2023-150710

(51) Int. Cl.
*F16H 1/32* (2006.01)
*F16H 57/021* (2012.01)
*H02K 7/116* (2006.01)
*F16H 57/02* (2012.01)

(52) U.S. Cl.
CPC ............ *F16H 1/32* (2013.01); *F16H 57/021* (2013.01); *H02K 7/116* (2013.01); *F16H 2001/323* (2013.01); *F16H 2001/327* (2013.01); *F16H 2057/02034* (2013.01); *F16H 2057/02052* (2013.01)

(58) Field of Classification Search
CPC ............................. F16H 2001/327; F16H 1/32
See application file for complete search history.

(56) References Cited

U.S. PATENT DOCUMENTS

| | | | | |
|---|---|---|---|---|
| 3,077,125 A | * | 2/1963 | Louton, Jr. | ............... F16H 1/32 74/665 S |
| 3,208,293 A | * | 9/1965 | Boehm | ................... B64C 13/24 475/343 |
| 9,856,943 B2 | * | 1/2018 | Saito | ......................... F16H 1/32 |
| 10,280,816 B2 | * | 5/2019 | Toda | ....................... F01L 1/352 |
| 11,162,574 B2 | * | 11/2021 | Saito | ....................... F16H 55/17 |

FOREIGN PATENT DOCUMENTS

| | | | | |
|---|---|---|---|---|
| CN | 106763524 A | * | 5/2017 | |
| CN | 110966355 A | * | 4/2020 | ............. F16H 1/32 |
| DE | 102015008196 A1 | * | 7/2016 | ............. F01L 1/352 |
| JP | 6838849 | | 3/2021 | |

* cited by examiner

*Primary Examiner* — Sherry L Estremsky
(74) *Attorney, Agent, or Firm* — JCIPRNET (57) ABSTRACT

A speed reducer includes a casing, a crankshaft, and a speed reducer main body. The crankshaft has a rotation support part rotatably supported by the casing and an eccentric part eccentric with respect to the rotation support part. The speed reducer main body has an engagement part engaged with an outer circumferential surface of the eccentric part, decelerates rocking rotation of the eccentric part received by the engagement part, and outputs the decelerated rotation to outside. The crankshaft is provided with a flange part protruding to an outward side in a radial direction from an end part of the rotation support part on the eccentric part side and abutting an end surface of the engagement part in an axial direction. The flange part is formed such that a center thereof coincides with a center of the eccentric part in a direction orthogonal to the axial direction.

6 Claims, 4 Drawing Sheets

SPEED REDUCER AND MOTOR WITH SPEED REDUCER

CROSS-REFERENCE TO RELATED APPLICATION

This application claims the priority benefits of Japanese application no. 2023-150710, filed on Sep. 19, 2023. The entirety of the above-mentioned patent application is hereby incorporated by reference herein and made a part of this specification.

BACKGROUND

Technical Field

The disclosure relates to a speed reducer and a motor with a speed reducer.

Description of Related Art

In the related art, motors with a speed reducer in which the speed reducer decelerates rotation of the motor and a high rotation torque is obtained are known. There are various kinds of mechanisms for speed reducers used in such motors with a speed reducer, and one mechanism, in which rotation of a motor is converted into rocking rotation of a crankshaft and the rocking rotation is decelerated by a planetary gear mechanism or the like is known (for example, refer to Patent Document 1).

The speed reducer described in Patent Document 1 (Japanese Patent No. 6838849) includes a casing, a crankshaft rotatably supported by the casing, and a speed reducer main body decelerating rocking rotation of an eccentric part of the crankshaft. The crankshaft has a rotation support part rotatably supported by the casing, and the eccentric part eccentric with respect to the rotation support part. The crankshaft rotates in response to rotation of an output shaft of the motor. The speed reducer main body includes an eccentric part bearing fitted to an outer circumferential surface of the eccentric part of the crankshaft, and a rocking gear rotatably supported by the eccentric part via the eccentric part bearing and having internal teeth and external teeth. In addition, the speed reducer main body includes a fixed gear fixed to the casing and having internal teeth meshed with the external teeth of the rocking gear, and an output gear rotatably held by the casing and having external teeth meshed with the internal teeth of the rocking gear. The internal teeth of the fixed gear and the external teeth of the output gear are formed concentrically with respect to a center axis of the crankshaft.

In this speed reducer, if the crankshaft rotates in response to rotation of the output shaft of the motor, the eccentric part of the crankshaft causes the rocking gear to rotate in a rocking manner via the eccentric part bearing. At this time, the rocking gear rotates on its axis while the external teeth thereof are meshed with the internal teeth of the fixed gear, and a rotational component is transmitted to the output gear through meshing parts between the internal teeth of the rocking gear and the external teeth of the output gear. Accordingly, the output gear outputs rotation decelerated to a predetermined reduction ratio to external equipment.

In addition, the crankshaft of this speed reducer is provided with a flange part protruding to an outward side in a radial direction from an end part of the rotation support part on the eccentric part side. This flange part is formed in an annular shape concentric with respect to the rotation support part. An end surface of the flange part facing the eccentric part side abuts an end surface of the eccentric part bearing (engagement part) fitted to the eccentric part. The flange part receives a thrust reaction force (reaction force in a fall-down direction) acting on the eccentric part bearing when a torque is transmitted to external equipment.

The speed reducer described in Patent Document 1 has a structure for receiving a thrust reaction force acting on the eccentric part bearing with the annular flange part of the crankshaft. However, the eccentric part bearing is supported by the outer circumferential surface of the eccentric part of the crankshaft, and the center in a direction orthogonal to an axial direction is concentric with respect to the eccentric part. For this reason, an axial center of the flange part of the crankshaft is offset in the radial direction with respect to the axial center of the eccentric part bearing.

Due to this, the end surface of the eccentric part bearing abuts the opposing end surface of the flange part in a non-concentric state (a state of being offset in the radial direction). For this reason, a thrust load (a load in the fall-down direction) acting on the flange part from the eccentric part bearing acts unevenly around a central part of the flange part. Therefore, in the speed reducer described in Patent Document 1, when a thrust reaction force acting on the eccentric part bearing increases, a significant deformation load is likely to act on the entire regions of the flange part and the crankshaft.

Hence, the disclosure provides a speed reducer, in which an input of an unnecessary deformation load to a crankshaft can be curbed, and a motor with a speed reducer.

SUMMARY

A speed reducer and a motor with a speed reducer according to the disclosure employ the following constitutions.

That is, a speed reducer according to a first aspect of the disclosure includes a casing; a crankshaft having a rotation support part rotatably supported by the casing and an eccentric part eccentric with respect to the rotation support part, and rotating in response to a rotation force from outside; and a speed reducer main body having an engagement part engaged with an outer circumferential surface of the eccentric part, decelerating rocking rotation of the eccentric part received by the engagement part, and outputting the decelerated rotation to outside. The crankshaft is provided with a flange part protruding to an outward side in a radial direction from an end part of the rotation support part on the eccentric part side and abutting an end surface of the engagement part in an axial direction. The flange part is formed such that a center thereof in a direction orthogonal to the axial direction coincides with a center of the eccentric part in a direction orthogonal to the axial direction.

DESCRIPTION OF THE EMBODIMENT

In the speed reducer according to the foregoing first aspect, regarding the crankshaft, the center of the flange part in a direction orthogonal to the axial direction and the center of the eccentric part in a direction orthogonal to the axial direction are formed to coincide with each other. For this reason, the engagement part of the speed reducer main body engaged with the outer circumferential surface of the eccentric part abuts the flange part in a concentric state. Therefore, a thrust load evenly acts on the flange part of the crankshaft from the engagement part of the speed reducer main body over a circumferential region so that a biased deformation load is less likely to act on the flange part.

According to the speed reducer of a second aspect of the disclosure, in the speed reducer according to the first aspect, the flange part is formed in an annular shape having a uniform clearance from the outer circumferential surface to the eccentric part in a circumferential direction.

In this case, the engagement part of the speed reducer main body engaged with the outer circumferential surface of the eccentric part is likely to abut an end surface of the flange part more evenly in the circumferential direction. In addition, with this constitution, since the flange part has an annular shape, the flange part can be made smaller and lighter.

According to the speed reducer of a third aspect of the disclosure, in the speed reducer according to the first aspect or the second aspect, the speed reducer main body includes a bearing serving as the engagement part; a rocking gear rotatably supported by the eccentric part of the crankshaft via the bearing, and having first internal teeth and first external teeth; a fixed gear fixed to the casing, meshed with the first external teeth of the rocking gear, and having second internal teeth concentric with respect to a center axis of the rotation support part of the crankshaft; and an output gear meshed with the first internal teeth of the rocking gear, and having second external teeth concentric with respect to the center axis.

In this case, if the crankshaft rotates in response to a rotation force from outside and the eccentric part of the crankshaft consequently rotates in a rocking manner, the rocking gear rotates in a rocking manner via the bearing engaged with the outer circumferential surface of the eccentric part. At this time, the rocking gear rotates on its axis in a state where the first external teeth are meshed with the second internal teeth of the fixed gear. In addition, at this time, since the second external teeth thereof are meshed with the second internal teeth of the rocking gear, the output rotation body rotates in response to rotation of the rocking gear on its axis. Rotation of the output rotation body is output to external equipment.

In the speed reducer having this constitution, when dynamic power is transmitted to external equipment, a reaction force is input from the external equipment through the output rotation body. This reaction force is input to the crankshaft through the output rotation body, the rocking rotation body, and the bearing. At this time, a portion of the reaction force acts on the flange part of the crankshaft as a thrust load (a load in a fall-down direction). Since the flange part has a shape which coincides with the center of the bearing in the radial direction, a thrust load evenly acts on the flange part from the bearing over the circumferential region about the center of the flange part.

In addition, a motor with a speed reducer according to the first aspect of the disclosure includes the speed reducer according to any one aspect of the first aspect to the third aspect, and a motor part joined to the crankshaft of the speed reducer.

In the speed reducer and the motor with a speed reducer according to the disclosure, the engagement part of the speed reducer main body engaged with the outer circumferential surface of the eccentric part of the crankshaft abuts the flange part in a concentric state. For this reason, a thrust load evenly acts on the flange part of the crankshaft from the engagement part of the speed reducer main body in the circumferential direction, and a biased deformation load is less likely to act on the flange part.

Therefore, when the speed reducer and the motor with a speed reducer according to the disclosure are employed, an input of an unnecessary deformation load to a crankshaft can be curbed.

Hereinafter, an embodiment of the disclosure will be described based on the drawings.

Figure 1:
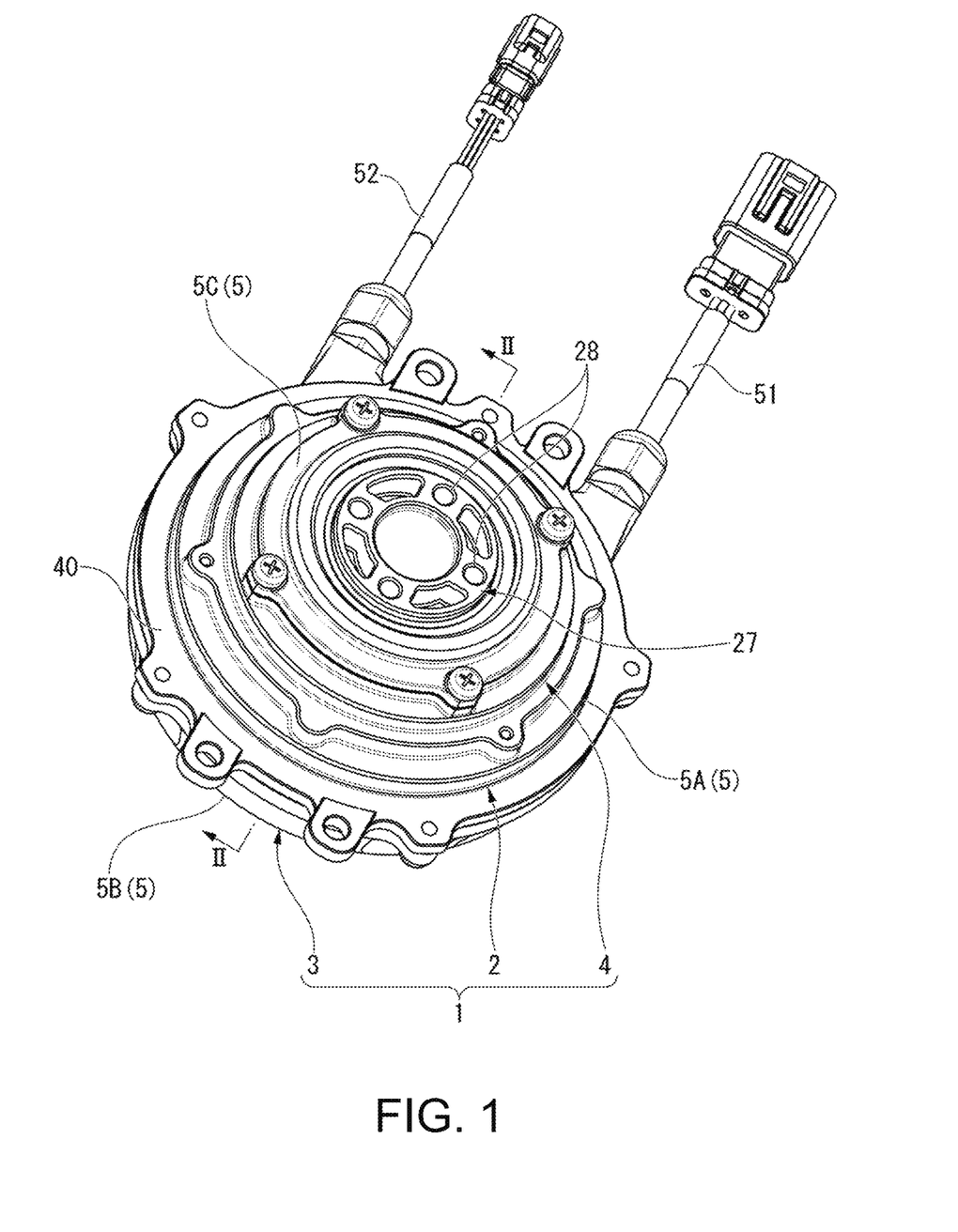
FIG. 1 is a perspective view of a motor with a speed reducer according to an embodiment.
Figure 2:
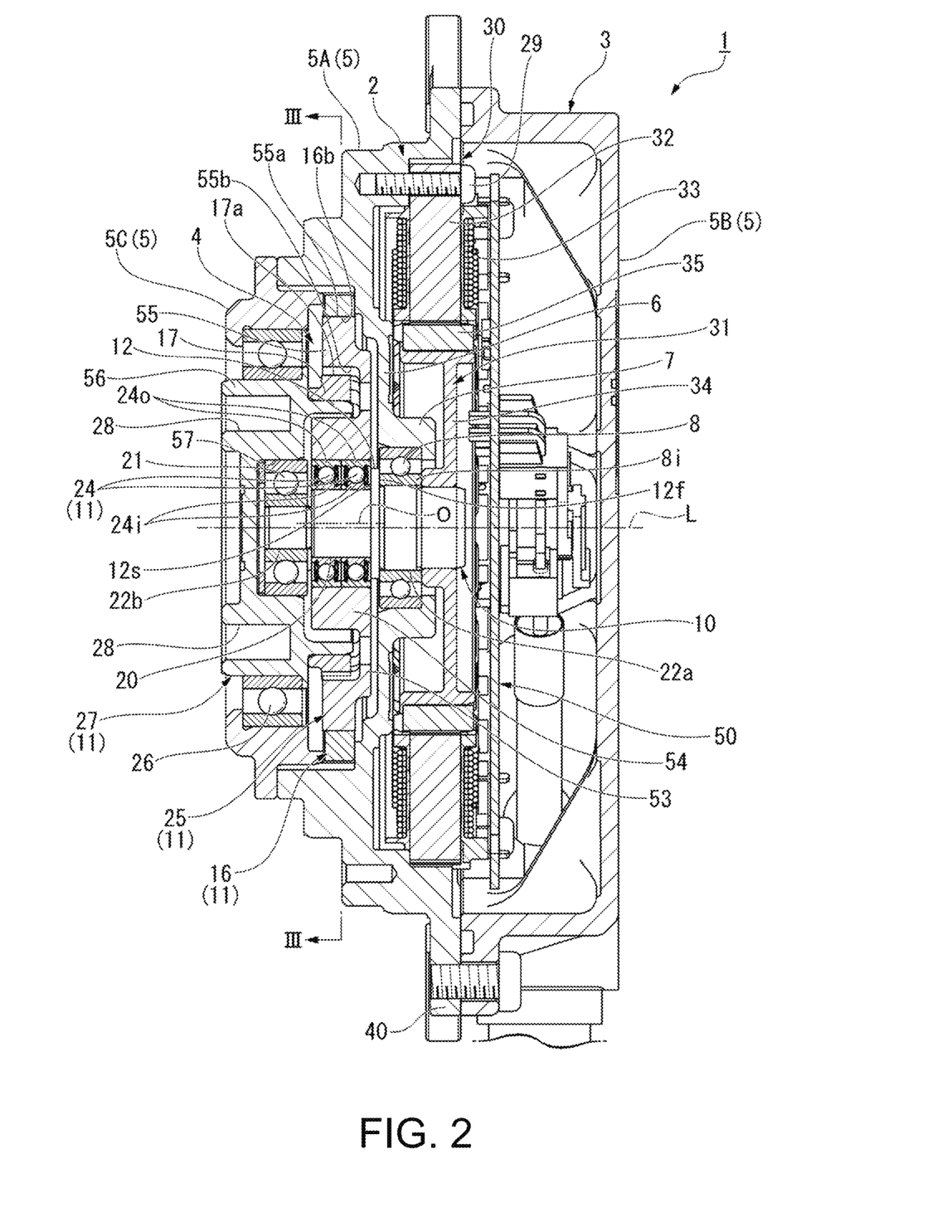
FIG. 2 is a cross-sectional view of the motor with a speed reducer according to the embodiment along line II-II in FIG. 1.

FIG. 1 is a perspective view of a motor 1 with a speed reducer according to the present embodiment. FIG. 2 is a cross-sectional view along line II-II in FIG. 1.

The motor 1 with a speed reducer according to the present embodiment is used in a wheel drive part or the like of a vehicle such as a motorcycle, for example. As shown in FIGS. 1 and 2, the motor 1 with a speed reducer includes a flat-shaped motor part 2 constituted as a so-called DC brushless motor, a control part 3 performing drive control of the motor part 2, a speed reducer 4 decelerating rotational power of the motor part 2 and transmitting the dynamic power to external equipment, and a casing 5 internally accommodating these. The casing 5 is constituted of a casing main body 5A having a short-axis cylindrical shape, a control part cover 5B closing one end part of the casing main body 5A in an axial direction (an end part on the right side in FIG. 2), and an annular block 5C attached to the other end part of the casing main body 5A in the axial direction (an end part on the left side in FIG. 2).

A motor axis (axis of rotation) of the motor part 2 coincides with a center axis L of a crankshaft 10 (which will be described below) of the speed reducer 4. In the following description, a direction along the motor axis (center axis L) may be simply referred to as an axial direction, a direction around the motor axis may be simply referred to as a circumferential direction, and a direction orthogonal to the motor axis and the circumferential direction may be referred to as a radial direction.

Inside the casing 5 of the motor 1 with a speed reducer, the control part 3, the motor part 2, and the speed reducer 4 are disposed side by side in this order from one end side toward the other end side in the axial direction.

A partition wall 6 protruding toward the inward side in the radial direction from a substantially central position in the axial direction is formed integrally with the casing main body 5A. Inside the casing main body 5A, the control part 3 side with the partition wall 6 in between serves as a motor accommodation part and a side opposite to the control part 3 with the partition wall 6 in between serves as a speed reducer accommodation part. In addition, a bearing housing 7 having substantially a cylindrical shape is formed integrally with the inward side of the partition wall 6 in the radial direction. A bearing 8 (ball bearing) for rotatably supporting one end side of the crankshaft 10 (which will be described below) of the speed reducer 4 is held by the bearing housing 7.

In the casing main body 5A, a coupling flange 40 protruding toward the outward side in the radial direction projects in an outer circumferential part on one end side in the axial direction. The control part cover 5B covering the outward side of the control part 3 is joined to this coupling flange 40. In the casing 5, a portion of the casing main body 5A can be fixed to a wheel support part or the like of the vehicle. In addition, an outer circumferential surface of the casing main body 5A has a diameter decreasing in a stepped shape from one end side toward the other end side in the axial direction. The annular block 5C is attached to the end part of the casing main body 5A on the other end side in the axial direction having the smallest diameter.

<Motor Part 2>

The motor part 2 is stored in the motor accommodation part inside the casing main body 5A. The motor part 2 includes a stator 30 having a disk shape with a hole, and a rotor 31 rotatably disposed on the inward side of the stator 30 in the radial direction.

The stator 30 has a stator core 32 formed by stacking a plurality of electromagnetic steel sheets or press-molding soft magnetic powder. An outer circumferential edge part of the stator core 32 is fastened and fixed to an end surface of the casing main body 5A on one side in the axial direction using a plurality of bolts 29.

In addition, in an inner circumferential part of the stator core 32, a plurality of teeth (reference sign omitted) protruding toward the inward side in the radial direction are formed side by side in the circumferential direction. A coil 33 is wound around each of these teeth. The coil 33 wound around each of the teeth is electrified with a three-phase alternating current from a power supply circuit (not shown). The stator 30 thereby generates a rotating magnetic field.

The rotor 31 includes a rotor core 34 having an annular shape in which an inner circumferential part is externally fitted and fixed to one end part of the crankshaft 10 of the speed reducer 4 in the axial direction, and a ring magnet 35 (permanent magnet) which is fixed to an outer circumferential part of the rotor core 34. An inner circumferential edge part of the rotor core 34 is disposed adjacent to one end side of the bearing 8, which is held by the bearing housing 7, in the axial direction. In the ring magnet 35, different magnetic poles (N poles and S poles) are magnetized in a manner of being alternately arranged in the circumferential direction on an outer surface side. The rotor 31 rotates due to an attractive force and a repulsive force acting between a rotating magnetic field generated on the stator 30 side and the ring magnet 35.

The permanent magnet disposed in the outer circumferential part of the rotor core 34 is not limited to the ring magnet 35 and may be a plurality of magnet pieces divided in the circumferential direction.

<Control Part>

The control part 3 includes the control part cover 5B having a cylindrical shape with a bottom, and a control board 50 fixed to the end surface of the casing main body 5A on one side in the axial direction on the inward side of the control part cover 5B. A control circuit for controlling the motor part 2, a sensor for detecting rotation of the rotor 31, and the like are mounted in the control board 50. In addition, a harness 51 (refer to FIG. 1) of a power system connected to a battery provided outside and a harness 52 (refer to FIG. 1) of a signal system connected to a control device provided outside are connected to the control board 50.

<Speed Reducer>

Figure 3:
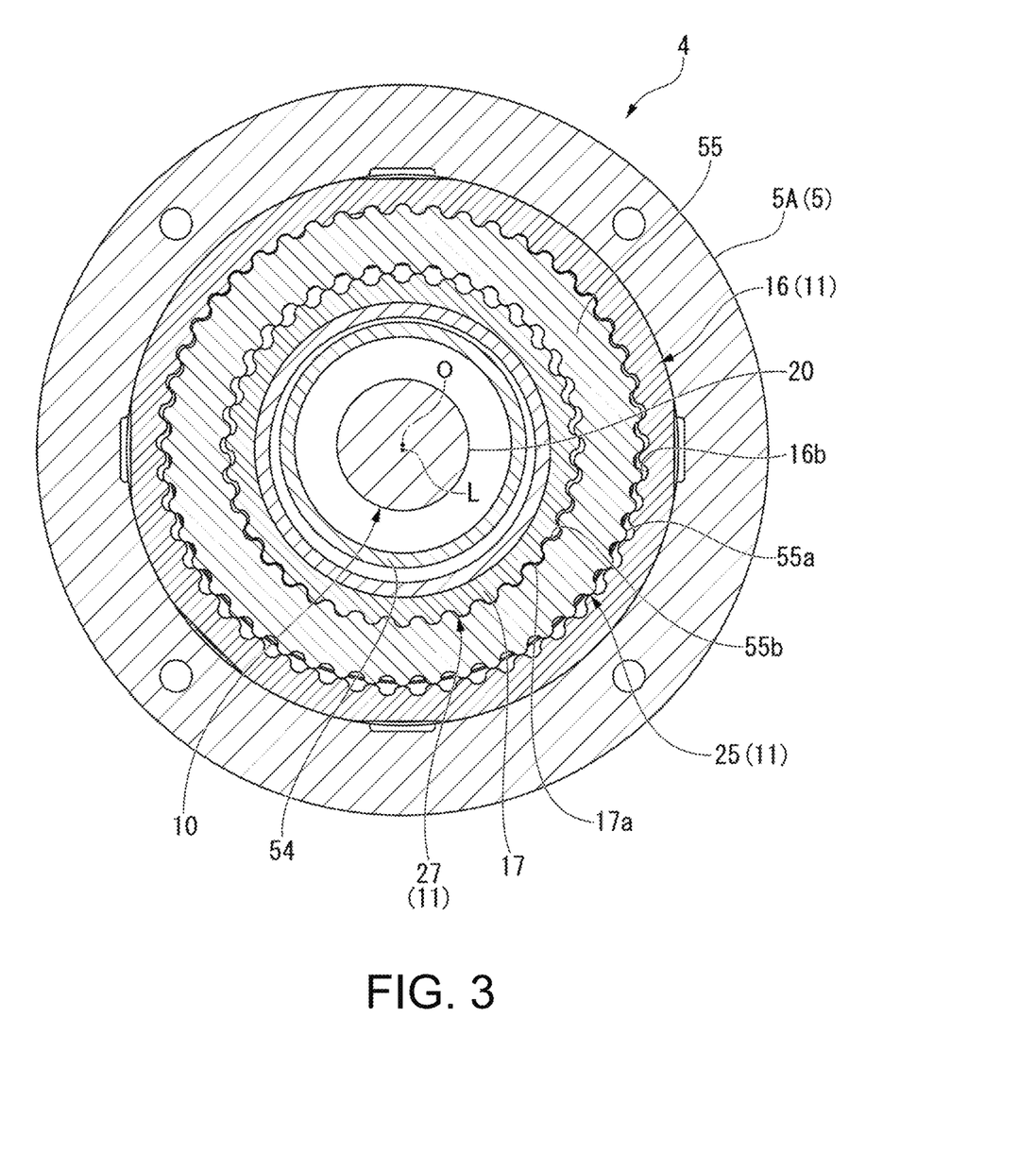
FIG. 3 is a cross-sectional view of the motor with a speed reducer according to the embodiment along line III-III in FIG. 2.
Figure 4:
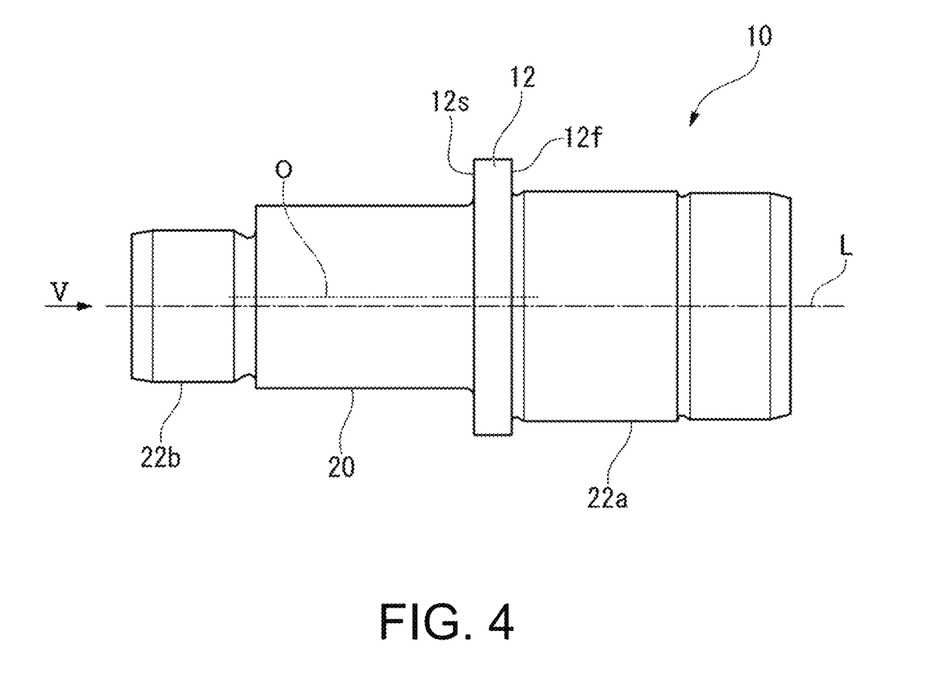
FIG. 4 is a side view of a crankshaft according to the embodiment.
Figure 5:
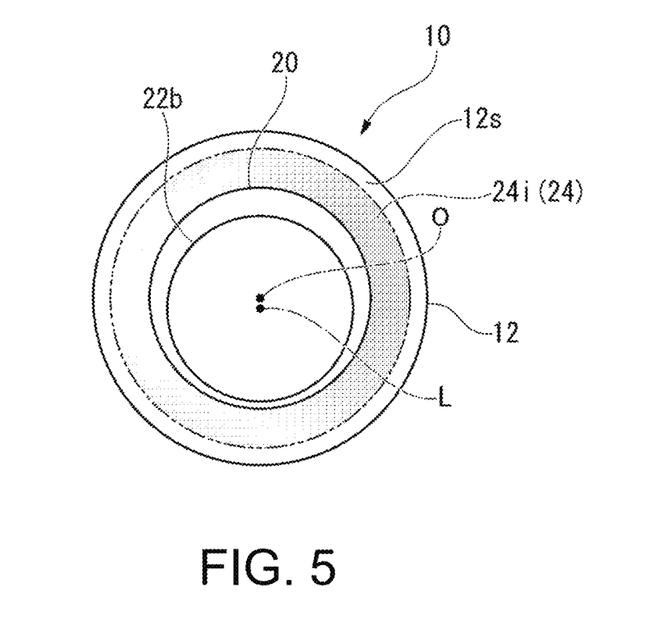
FIG. 5 is a view of the crankshaft according to the embodiment along arrow IV in FIG. 4.

FIG. 3 is a cross-sectional view of the motor 1 with a speed reducer along line III-III in FIG. 2. FIG. 4 is a side view of the crankshaft 10, and FIG. 5 is a view of the crankshaft 10 along arrow IV in FIG. 4.

The speed reducer 4 includes the casing 5 (casing main body 5A), the crankshaft 10 rotating in response to a rotation force from the motor part 2, and a speed reducer main body 11 decelerating rotation of an eccentric part 20 of the crankshaft 10 and outputting the decelerated rotation to outside (wheels of the vehicle). The speed reducer 4 according to the present embodiment is constituted as a hypocycloid speed reducing mechanism.

The speed reducing mechanism of the speed reducer 4 is not limited to a hypocycloid speed reducing mechanism and may be a different mechanism as long as it is a mechanism capable of decelerating rotation of the eccentric part 20 of the crankshaft 10 and outputting the decelerated rotation to outside.

The crankshaft 10 includes a pair of rotation support parts 22a and 22b rotatably supported by the casing 5 via bearings 8 and 21, and the eccentric part 20 eccentric with respect to center axes L (axes of rotation) of the rotation support parts 22a and 22b. Both the rotation support parts 22a and 22b are formed in columnar shapes and are coaxially formed such that the center axes L thereof coincide with each other. The rotation support parts 22a and 22b are respectively disposed on one end side and the other end side of the crankshaft 10 in the axial direction. The eccentric part 20 is formed in a columnar shape, and end parts thereof on both sides in the axial direction are joined to the rotation support parts 22a and 22b. The outer circumferential surface of the eccentric part 20 serves as a cylindrical surface about a center axis O separated from the center axes L of the rotation support parts 22a and 22b in the radial direction. When the rotation support parts 22a and 22b rotate in response to a rotation force from the motor part 2, the eccentric part 20 rotates in a rocking manner about the center axis L at a constant radius.

A pair of bearings 24 (eccentric part bearings constituted of ball bearings) are provided side by side in the axial direction on the outer circumferential surface of the eccentric part 20. These bearings 24 rotatably support an inner circumferential part of a rocking gear 25 (which will be described below) of the speed reducer main body 11. In the present embodiment, these bearings 24 constitute engagement parts engaged with the outer circumferential surface of the eccentric part 20. Each of the bearings 24 has an inner ring 24i fitted to the outer circumferential surface of the eccentric part 20, and an outer ring 24o fitted to an inner circumferential surface of the rocking gear 25.

The rotation support part 22a disposed on one end side (the right side in FIGS. 2 and 3) of the crankshaft 10 in the axial direction is turnably supported by the partition wall 6 of the casing main body 5A via the bearing 8. In addition, the rotation support part 22b disposed on the other end side of the crankshaft 10 in the axial direction (the left side in FIGS. 2 and 3) is rotatably supported by an output gear 27 (which will be described below) of the speed reducer 4 via the bearing 21. The output gear 27 is rotatably supported by the annular block 5C of the casing 5 via a different bearing 26. Therefore, the rotation support part 22b of the crankshaft 10 on the other end side in the axial direction is rotatably supported by the annular block 5C (casing 5).

As shown in FIGS. 2, 4, and 5, a flange part 12 protruding to the outward side in the radial direction beyond the outer circumferential surface of the rotation support part 22a is formed integrally with the end part on the eccentric part 20 side in the rotation support part 22a on the motor part 2 side. The flange part 12 has a circular outer surface shape, but it is not a circular shape concentric with respect to the rotation support part 22a and is a circular shape concentric with respect to the adjacent eccentric part 20 in the axial direction. Therefore, the flange part 12 is formed such that the center thereof in a direction orthogonal to the axial direction coincides with the center of the eccentric part 20 in a direction orthogonal to the axial direction (point passing through the center axis O of the eccentric part 20).

End surfaces 12f and 12s of the flange part 12 on both sides in the axial direction are formed by flat surfaces orthogonal to the axial direction. The end surface 12f of the flange part 12 on one side stands on the outward side in the radial direction from the outer circumferential surface of the rotation support part 22a, and the end surface 12s of the flange part 12 on the other side stands on the outward side in the radial direction from the outer circumferential surface of the eccentric part 20.

The end surface 12f of the flange part 12 on one side abuts an end surface of an inner ring 8i of the bearing 8 supporting the rotation support part 22a as shown in FIG. 2. The flange part 12 thereby restricts positional deviation of the bearing 8 to the other end side in the axial direction.

In addition, as shown in FIG. 2, the end surface 12s of the flange part 12 on the other side abuts an end surface of the inner ring 24i of the bearing 24 on one side fitted to the outer circumferential surface of the eccentric part 20. The flange part 12 thereby restricts positional deviation of the bearings 24 to one end side in the axial direction and receives a thrust reaction force acting on the bearings 24 through the speed reducer main body 11 (a load in a fall-down direction).

As shown in FIG. 5, the flange part 12 is formed in an annular shape having a uniform clearance from the outer circumferential surface to the eccentric part 20 in the circumferential direction. For this reason, the end surfaces of the inner rings 24i of the bearings 24 evenly abut the end surface 12s of the flange part 12 in the circumferential direction.

In FIG. 5, a region on the end surface 12s of the flange part 12 where the end surfaces of the inner rings 24i of the bearings 24 abut is dotted.

In addition, the speed reducer main body 11 includes the foregoing pair of bearings 24 which are fitted to the eccentric part 20 of the crankshaft 10, the rocking gear 25 in which the pair of bearings 24 are fixed to the inner circumferential part and internal teeth 55b (first internal teeth) and external teeth 55a (first external teeth) are provided in an outer circumferential region, and a fixed gear 16 which has internal teeth 16b (second internal teeth) meshed with the external teeth 55a of the rocking gear 25, and the output gear 27 which has external teeth 17a (second external teeth) meshed with the internal teeth 55b of the rocking gear 25.

The rocking gear 25 has a base wall 53 extending in the radial direction and having a disk shape with a hole, a bearing housing 54 having substantially a cylindrical shape protruding to a side opposite to the motor part 2 side from an end part of the base wall 53 on the inward side in the radial direction, and a teeth wall 55 having substantially a cylindrical shape connected to the end part of the base wall 53 on the outward side in the radial direction. A recessed part having substantially a cylindrical shape opening toward a side opposite to the motor part 2 side is formed between the teeth wall 55 and the bearing housing 54. Each of the outer rings 24o of the bearings 24 described above is fitted and fixed to the inner circumferential surface of the bearing housing 54. In the teeth wall 55 of the rocking gear 25, the external teeth 55a are formed on the outer circumferential surface side, and the internal teeth 55b are formed on the inner circumferential surface side.

The fixed gear 16 in its entirety is formed in an annular shape. The fixed gear 16 is fixed to the inner circumferential part of the casing main body 5A. The internal teeth 16b are formed on the inner circumferential surface of the fixed gear 16. The fixed gear 16 is disposed on an outer circumferential side of the teeth wall 55 of the rocking gear 25, and the internal teeth 16b on the inner circumferential surface can mesh with the external teeth 55a of the teeth wall 55.

The internal teeth 16b of the fixed gear 16 are formed to be concentric with respect to the center axes L of the rotation support parts 22a and 22b of the crankshaft 10 in a state where the fixed gear 16 is fixed to the casing main body 5A. The outer diameter of the external teeth 55a of the rocking gear 25 is formed to be smaller than the inner diameter of the internal teeth 16b of the fixed gear 16. In addition, the number of teeth of the external teeth 55a of the rocking gear 25 and the number of teeth of the internal teeth 16b of the fixed gear 16 are set to different numbers of teeth. For this reason, if the rocking gear 25 rotates in a rocking manner in response to rocking rotation of the crankshaft 10, the rocking gear 25 rotates on its axis in a predetermined direction in response to a reaction force from the external teeth 55a while the external teeth 55a are meshed with the internal teeth 16b of the fixed gear 16. The speed of rotation thereof on its axis is decelerated to a predetermined reduction ratio with respect to rocking rotation of the crankshaft 10.

The output gear 27 includes a base wall 56 having a disk shape extending in the radial direction, and an external teeth ring 17 having substantially a cylindrical shape protruding toward the motor part 2 side from a portion near the outward side of the base wall 56 in the radial direction. The outer circumferential surface of the base wall 56 is rotatably supported by the inner circumferential surface of the annular block 5C of the casing 5 via the bearing 26. The output gear 27 is a member outputting rotation of the motor part 2 decelerated by the speed reducer main body 11 to external equipment. A fastening hole 28 for fastening and fixing the output gear 27 to external equipment (wheels of the vehicle) is provided on the end surface of the base wall 56 on the outward side.

In addition, a bearing accommodating recessed part 57 is formed on a surface of the base wall 56 on the motor part 2 side. The bearing accommodating recessed part 57 is provided in a central region of the base wall 56 in the radial direction. The bearing 21 for pivotally supporting the rotation support part 22b of the crankshaft 10 is held by the bearing accommodating recessed part 57.

The external teeth ring 17 is disposed in a manner of being inserted into an annular recessed part between the bearing housing 54 of the rocking gear 25 and the teeth wall 55 in a state where the output gear 27 is held by the annular block 5C (casing 5). The external teeth 17a which can be meshed with the internal teeth 55b of the rocking gear 25 are formed on the outer circumferential surface of the external teeth ring 17.

In the present embodiment, the external teeth ring 17 has a structure in which another annular member having the external teeth 17a is fixed to a tube part formed integrally with the base wall 56. However, the structure of the external teeth ring 17 is not limited to this. The external teeth ring 17 in its entirety may be formed of a member integrated with the base wall 56.

The external teeth 17a of the external teeth ring 17 are formed to be concentric with respect to the center axes L of the rotation support parts 22a and 22b of the crankshaft 10 in a state where the output gear 27 is held by the annular block 5C (casing 5). The outer diameter of the external teeth 17a of the external teeth ring 17 is formed to be smaller than the inner diameter of the internal teeth 55b of the rocking gear 25. In addition, the number of teeth of the external teeth 17a of the external teeth ring 17 and the number of teeth of the internal teeth 55b of the rocking gear 25 are set to be the same. Due to these constitutions, if the rocking gear 25 rotates in a rocking manner in response to rocking rotation of the crankshaft 10, only the rotation of the rocking gear 25 on its axis is transmitted to the output gear 27. Therefore, rotational power of the motor part 2 decelerated through the speed reducer 4 is output to external equipment (wheels of the vehicle) through the output gear 27.

<Effects of Embodiment>

In the speed reducer 4 (the motor 1 with a speed reducer) according to the present embodiment, the flange part 12 of the crankshaft 10 is formed such that the center of the flange part 12 in a direction orthogonal to the axial direction and the center (center axis O) of the eccentric part 20 coincide with each other. For this reason, the inner rings 24i (engagement parts) of the bearings 24 of the speed reducer main body 11 abut the flange part 12 of the crankshaft 10 in a concentric state. As a result, a thrust load evenly acts from the inner rings 24i of the bearings 24 to the flange part 12 of the crankshaft 10 in the circumferential direction so that a biased deformation load is less likely to act on the flange part 12.

Therefore, when the speed reducer 4 (the motor 1 with a speed reducer) according to the present embodiment is employed, an input of an unnecessary deformation load to the crankshaft 10 during use can be curbed.

Thus, by employing the speed reducer 4 (the motor 1 with a speed reducer) according to the present embodiment, it is possible to contribute to Goal 7 {Ensure access to affordable, reliable, sustainable and modern energy for all} of the Sustainable Development Goals (SDGs) led by United Nations.

In addition, in the speed reducer 4 (the motor 1 with a speed reducer) according to the present embodiment, the flange part 12 of the crankshaft 10 is formed in an annular shape having a uniform clearance from the outer circumferential surface to the eccentric part 20 in the circumferential direction. For this reason, the inner rings 24i of the bearings 24 are likely to abut the end surface 12s of the flange part 12 of the crankshaft 10 more evenly in the circumferential direction.

Therefore, when this constitution is employed, an input of an unnecessary deformation load to the crankshaft 10 during use can be further curbed. In addition, with this constitution, since the outer circumference of the flange part 12 has a circular shape, the flange part 12 can be made smaller and lighter than when the outer circumference of the flange part 12 has a polygonal shape.

In addition, in the speed reducer 4 (the motor 1 with a speed reducer) according to the present embodiment, the speed reducer main body includes the bearings 24, the rocking gear 25, the fixed gear 16, and the output gear 27. The bearings 24 are held by the inner circumference of the rocking gear 25, and the internal teeth 55b (first internal teeth) and the external teeth 55a (second external teeth) are provided in the outer circumferential region of the rocking gear 25. Further, the fixed gear 16 includes the internal teeth 16b (second internal teeth) fixed to the casing 5, meshed with the external teeth 55a of the rocking gear 25, and concentric with respect to the center axis L of the crankshaft 10. In addition, the output gear 27 includes the external teeth (second external teeth) meshed with the internal teeth 55b of the rocking gear 25 and concentric with respect to the center axis L.

For this reason, when this constitution is employed, dynamic power of the motor part can be efficiently decelerated and output to external equipment, whereas a portion of a reaction force from external equipment is likely to act as a significant load pressurizing the bearings 24 in the fall-down direction. However, in the present embodiment, since the flange part 12 of the crankshaft 10 is formed such that the center of the flange part 12 in a direction orthogonal to the axial direction and the center (center axis O) of the eccentric part 20 coincide with each other, an input of an unnecessary deformation load to the crankshaft 10 can be reliably curbed.

The disclosure is not limited to the foregoing embodiment, and various design changes can be made within a range not departing from the gist thereof. For example, in the foregoing embodiment, the motor 1 with a speed reducer is applied to a wheel drive part of a vehicle, but application of the motor 1 with a speed reducer is not limited to this.

The motor 1 with a speed reducer can be applied to various other kinds of equipment as long as the equipment is used by decelerating dynamic power of the motor.

In addition, in the foregoing embodiment, the flange part 12 provided in the crankshaft 10 is formed in a circular shape (annular shape), but the shape of the flange part 12 is not limited to this. For example, the flange part 12 may have a polygonal shape when viewed in the axial direction. In this case as well, the flange part 12 need only be formed such that the center thereof in a direction orthogonal to the axial direction coincides with the center of the eccentric part 20 in a direction orthogonal to the axial direction.

It will be apparent to those skilled in the art that various modifications and variations can be made to the disclosed embodiment without departing from the scope or spirit of the disclosure. In view of the foregoing, it is intended that the disclosure covers modifications and variations provided that they fall within the scope of the following claims and their equivalents.

What is claimed is:

1. A speed reducer comprising:
   a casing;
   a crankshaft having a rotation support part rotatably supported by the casing and an eccentric part eccentric with respect to the rotation support part, and rotating in response to a rotation force from outside; and
   a speed reducer main body having an engagement part engaged with an outer circumferential surface of the eccentric part, decelerating rocking rotation of the eccentric part received by the engagement part, and outputting the decelerated rotation to outside,
   wherein the crankshaft is provided with a flange part protruding to an outward side in a radial direction from an end part of the rotation support part on the eccentric part side and abutting an end surface of the engagement part in an axial direction,
   the flange part is formed such that a center thereof in a direction orthogonal to the axial direction coincides with a center of the eccentric part in a direction orthogonal to the axial direction,
   the rotation support part is rotatably supported by the casing via a rotation support bearing,
   the rotation support bearing is engaged with an outer circumferential surface of the rotation support part and abuts directly on an end surface of the flange part, an outer diameter of the rotation support part is larger than an outer diameter of the eccentric part, and an outer diameter of the rotation support bearing is larger than an outer diameter of the engagement part.

2. The speed reducer according to claim 1, wherein the flange part is formed in an annular shape having a uniform clearance from the outer circumferential surface to the eccentric part in a circumferential direction.

3. A motor with a speed reducer comprising:
the speed reducer according to claim 2; and
a motor part joined to the crankshaft of the speed reducer.

4. The speed reducer according to claim 1, wherein the speed reducer main body includes
a bearing serving as the engagement part,
a rocking gear rotatably supported by the eccentric part of the crankshaft via the bearing, and having first internal teeth and first external teeth,
a fixed gear fixed to the casing, meshed with the first external teeth of the rocking gear, and having second internal teeth concentric with respect to a center axis of the rotation support part of the crankshaft, and
an output gear meshed with the first internal teeth of the rocking gear, and having second external teeth concentric with respect to the center axis.

5. A motor with a speed reducer comprising:
the speed reducer according to claim 4; and
a motor part joined to the crankshaft of the speed reducer.

6. A motor with a speed reducer comprising:
the speed reducer according to claim 1; and
a motor part joined to the crankshaft of the speed reducer.

\* \* \* \* \*